(No Model.)

2 Sheets—Sheet 1.

L. C. PRESSLEY.
MOTOR FOR PROPELLING CARS AND VEHICLES.

No. 330,151. Patented Nov. 10, 1885.

Witnesses:

Inventor,
L. C. Pressley.
By Dewey &
Attorneys (No Model.) 2 Sheets—Sheet 2.

L. C. PRESSLEY.
MOTOR FOR PROPELLING CARS AND VEHICLES.

No. 330,151. Patented Nov. 10, 1885.

Witnesses,

Inventor,
L. C. Pressley.
By Dewey & Co.
Attorneys

UNITED STATES PATENT OFFICE.

LEONIDAS C. PRESSLEY, OF SAN FRANCISCO, CALIFORNIA.

MOTOR FOR PROPELLING CARS AND VEHICLES.

SPECIFICATION forming part of Letters Patent No. 330,151, dated November 10, 1885.

Application filed August 26, 1885. Serial No. 175,396. (No model.)

*To all whom it may concern:*

Be it known that I, LEONIDAS C. PRESSLEY, of the city and county of San Francisco, State of California, have invented an Improvement in Motors for Cars and Vehicles; and I hereby declare the following to be a full, clear, and exact description of the same.

My invention relates to a motor which is applicable to cars or other vehicles.

It consists of a frame-work supporting a series of guides, which may be tilted so as to stand in a vertical position, with their ends downward, and a series of weights which slide upon these guides and are connected with a central shaft by cords or gearing, so that as they move down these guides their power will be applied to this shaft, and by an intermediate mechanism this power is communicated to the traction-wheels of the vehicle.

My invention also relates to certain details of construction, all of which will be more fully explained by reference to the accompanying drawings, in which—

Figure 1:
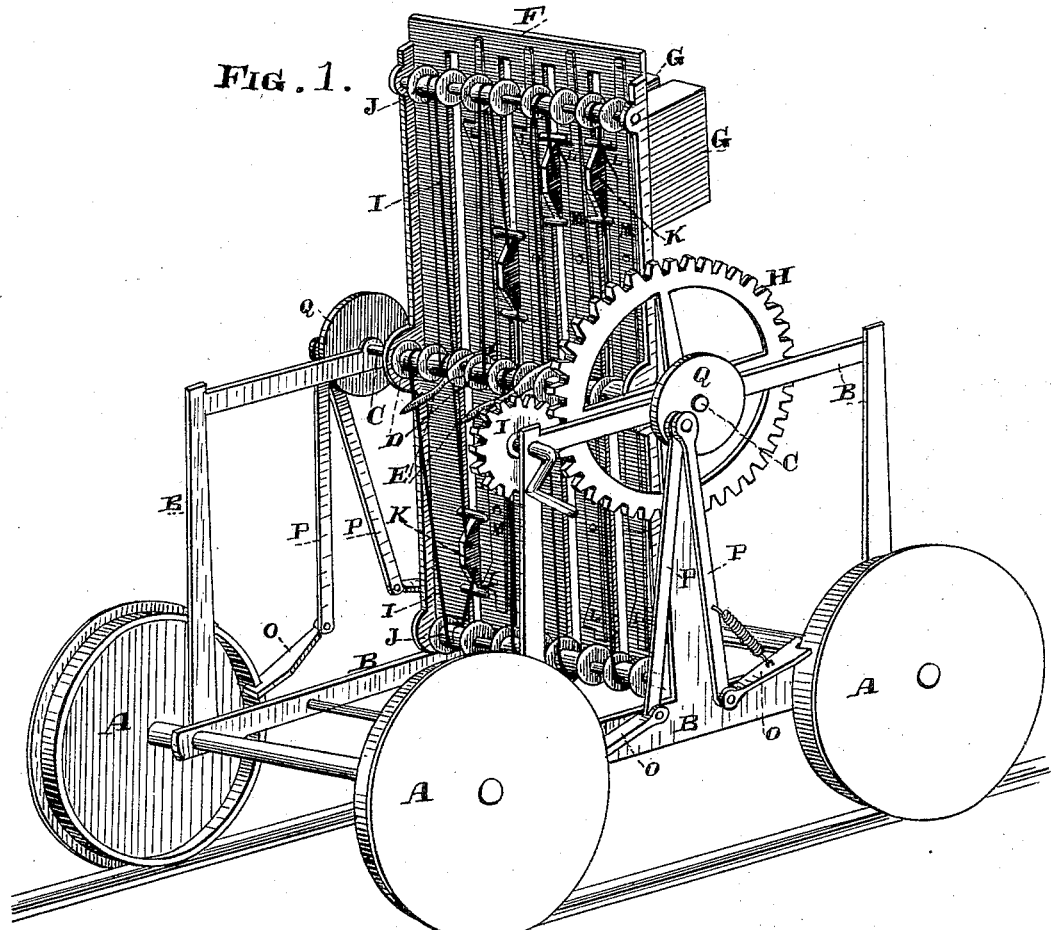
Figure 2:
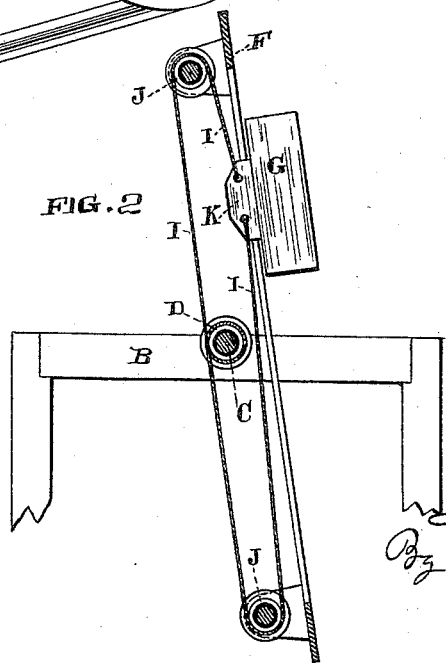
Figure 3:
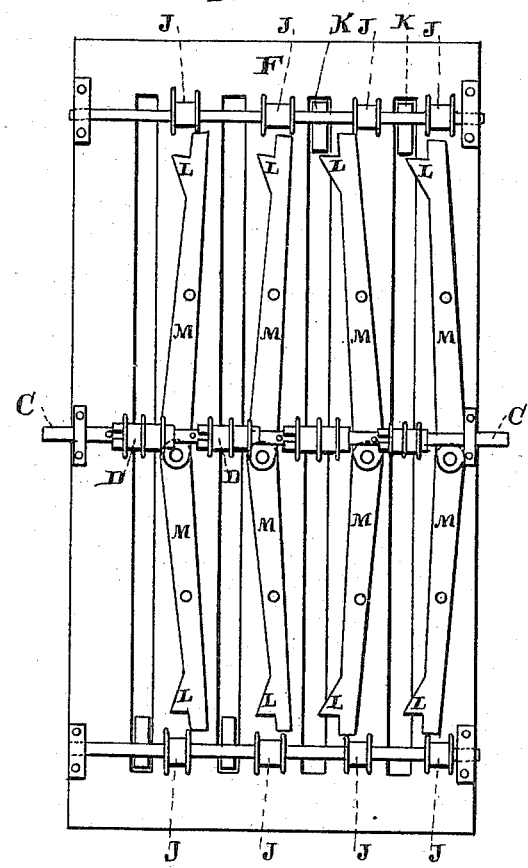

Figure 1 is a view of the apparatus. Fig. 2 is a vertical section of the frame-work F. Fig. 3 is an elevation of the frame F.

A A are the bearing or traction wheels of the vehicle or car to which my invention is to be applied, and B is the truck or frame-work uniting the wheels, and having suitable standards or frame-work extending upward and supporting a shaft, C. Upon this shaft are spools or drums D and clutch mechanisms E, by which they may be thrown into connection, so as to revolve with the shaft, or out of connection, so that the shaft turns loosely within them. Upon this shaft is journaled, so as to turn independently, a frame-work, F, of considerable length, extending to each side of the shaft, and this frame-work has guides formed upon it in which heavy weights G may slide from end to end.

Upon one side of the frame F is secured a gear-wheel, H, which may be engaged by a pinion, I, and this may be driven by a crank-wheel or other suitable mechanism, so as to turn the larger gear-wheel. When this is turned, it also carries with it the frame or guides upon which the weights slide, being secured to this frame. It will be manifest that if the weights are at one end of the guides and the frame is turned so as to stand vertically, with the other end downward, these weights will slide to that end when released. I prefer to make these weights quite heavy, and there may be as many of them as may be desirable to use. In the present case I have shown four, each weight having a guide or ways upon which it slides. Cords or chains I are connected with the weights, and pass over direction-pulleys J at each end of the frame-work, extending from these pulleys toward the central shaft, C, where they are wound around the drums D from opposite directions, so that when the weights slide down in one direction the cords or chains will be uncoiled from one side of the drum and be coiled upon the other. When the guides are reversed, the opposite action takes place. By means of the clutch mechanism E, before described, the drums may be engaged with the shaft C so as to cause this shaft to revolve as the weights move downward from the upper to the lower end of the guides.

It may be desirable to use all the weights at one time; or it may be found better in some cases to use one weight at a time, applying its power until it has reached the lower end of the guides, and then disengaging another weight and allowing it to move down, and so on until all have been employed. In order to operate the device in this manner, lugs K project from the weights, or their guides and latches L are formed upon lever-arms M, so as to engage these lugs when the weights have reached the bottom in their course. The weights may then be held in this position until the frame-work and the guides have been reversed, when one or more of the weights may be disengaged by the operator and allowed to move downward, and the others may be successively disengaged.

It will be manifest that these levers may be so arranged that as each weight reaches the bottom of its course it will strike the lever of the next weight and disengage that, and so on until all are disengaged and have run their course.

In order to communicate the alternate reverse movement of the shaft C to the traction-wheels, so that they may be caused to revolve in the same direction at all times, I employ clutch-levers O, which grasp the rims or flanges upon the wheels, as shown. The opposite ends of these levers are connected by pitmen P with cranks Q upon the shaft C.

It will be manifest that the rotary movement of the cranks will produce a reciprocating movement of the pitmen, which will be communicated to the clutch-lever arms, and these will always grasp the wheel so as to move it in one direction, but will release it on the backward movement, so that whatever may be the direction of the shaft C it will always produce a reciprocating movement and a similar action of the clutch-levers upon the traction-wheels.

Various mechanisms may be used for reversing the frame-work and guides carrying the weights—such as a worm-gear—but these are all familiar to mechanics, and may be substituted, if desirable.

Having thus described my invention, what I claim as new, and desire to secure by Letters Patent, is—

1. A frame with guides upon which weights travel from end to end, said frame being journaled upon a shaft so that it may be reversed, in combination with a gear-wheel and pinion and crank-shaft, substantially as herein described.

2. A frame or guides mounted upon a central shaft and reversible about it, weights fitted to slide in said guides, direction-pulleys at each end, and cords or chains connected with the weights passing over the direction-pulleys, and thence to drums upon the central shaft, in combination with clutches E, by which the drums may be caused to engage with the shaft, substantially as herein described.

3. A frame or guides supported upon a central shaft, and means by which said frame may be reversed, and weights sliding in the guides and connected with drums upon the central shaft by cords or chains which pass over direction-pulleys at each end of the frame, as shown, in combination with levers and clutches by which the weights may be retained in position at either end of the guides while the frame is being reversed, substantially as herein described.

In testimony whereof I have hereunto set my hand.

LEONIDAS C. PRESSLEY.

Witnesses:
S. H. NOURSE,
H. C. LEE.